United States Patent
Shimamoto et al.

(10) Patent No.: US 9,217,043 B2
(45) Date of Patent: Dec. 22, 2015

(54) PROCESS FOR PRODUCING SOLID CELLULOSE AND PROCESS FOR PRODUCING CELLULOSE ESTER

(71) Applicant: DAICEL CORPORATION, Osaka-shi, Osaka (JP)

(72) Inventors: Shu Shimamoto, Tokyo (JP); Hiroyuki Ohno, Tokyo (JP)

(73) Assignee: DAICEL CORPORATION, Osaka-shi (JP)

( * ) Notice: Subject to any disclaimer, the term of this patent is extended or adjusted under 35 U.S.C. 154(b) by 186 days.

(21) Appl. No.: 14/139,458

(22) Filed: Dec. 23, 2013

(65) Prior Publication Data

US 2014/0212670 A1    Jul. 31, 2014

Related U.S. Application Data

(60) Provisional application No. 61/759,671, filed on Feb. 1, 2013.

(30) Foreign Application Priority Data

Jan. 25, 2013  (JP) ................................ 2013-012632

(51) Int. Cl.
  *C08B 3/06*    (2006.01)
  *C08B 1/00*    (2006.01)
  *D01F 2/02*    (2006.01)

(52) U.S. Cl.
  CPC . *C08B 3/06* (2013.01); *C08B 1/003* (2013.01); *D01F 2/02* (2013.01); *Y10T 428/2991* (2015.01)

(58) Field of Classification Search
  CPC ............. C08B 3/06; C08B 1/003; D01F 2/02; Y10T 428/2991
  USPC ............................ 428/403; 536/56, 70; 264/5
  See application file for complete search history.

(56) References Cited

U.S. PATENT DOCUMENTS 3,535,722 A * 10/1970 Vigo et al. ......................... 8/188
8,188,267 B2 * 5/2012 Buchanan et al. ............. 536/119
2014/0367879 A1 * 12/2014 Zikeli et al. .................... 264/115

FOREIGN PATENT DOCUMENTS

WO    WO2013085053    *  6/2013

* cited by examiner

*Primary Examiner* — Leszek Kiliman
(74) *Attorney, Agent, or Firm* — Birch, Stewart, Kolasch & Birch, LLP

(57) ABSTRACT

Provided is a process for obtaining solid cellulose, such as a cellulose solidified article or cellulose shaped article, from a cellulose solution without causing discharge of large amounts of waste liquids and environmental issues such as large energy consumption. The process produces solid cellulose through the steps of (A) dissolving cellulose in a solvent (s1) to give a cellulose solution, where the solvent (s1) includes at least one onium hydroxide in a content of from 45 to 85 percent by weight and water in a content of from 15 to 55 percent by weight, and the at least one onium hydroxide is selected from the group consisting of quaternary phosphonium hydroxides and quaternary ammonium hydroxides; (B) bringing the cellulose solution into contact with a poor solvent (s2) to precipitate cellulose as a cellulose solidified article; and (C) separating and collecting the cellulose solidified article.

20 Claims, 1 Drawing Sheet

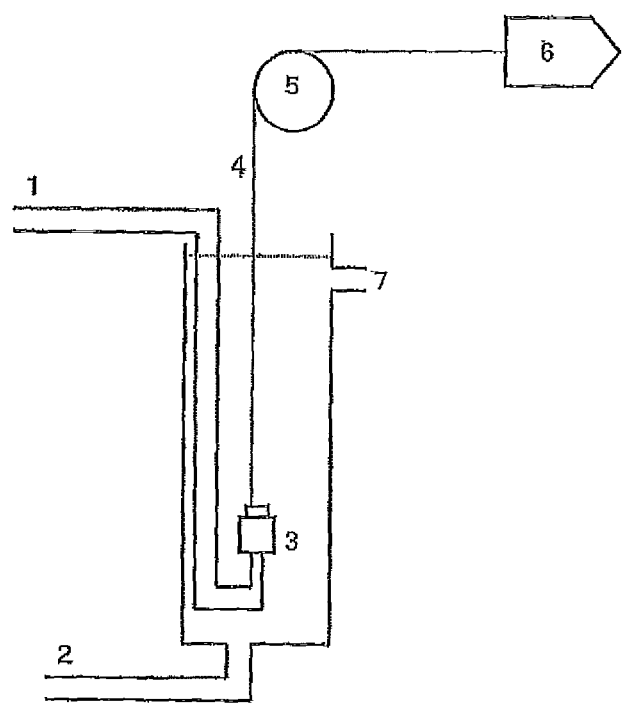

PROCESS FOR PRODUCING SOLID CELLULOSE AND PROCESS FOR PRODUCING CELLULOSE ESTER

CROSS REFERENCE TO RELATED APPLICATIONS

This non-provisional application claims priority under 35 U.S.C. 119(e) to U.S. Provisional Application No. 61/759,671 filed on Feb. 1, 2013 and under 35 U.S.C 119(a) to patent application Ser. No. 2013-012632 filed in Japan on Jan. 25, 2013, all of which are hereby expressly incorporated by reference into the present application.

TECHNICAL FIELD

The present invention generally relates to processes for producing solid cellulose, such as cellulose solidified articles or cellulose shaped articles, from a solution of cellulose dissolved in a specific aqueous quaternary onium hydroxide. The present invention also relates to processes for producing cellulose esters from the solid cellulose produced by the processes.

BACKGROUND ART

A viscose process has been known as a process for preparing fibrous cellulose (cellulose fibers). The term "viscose" refers to an intermediate obtained in one of techniques for producing rayon, a kind of regenerated cellulose. The term "viscose process" is a generic name for technologies to produce rayon through the intermediate viscose. The viscose is capable of giving articles in the form of not only a fiber (e.g., rayon), but also a film (e.g., cellophane). The viscose process was invented by E. J. Bevan et al. in 1892. Specifically, they found that cellulose can be regenerated by treating a cellulose compound with sodium hydroxide and carbon disulfide to give a viscous solution (viscose) and treating the viscous solution with an acid. The viscose process is schematically illustrated as follows. In the process, a natural cellulose fiber is chemically modified to dissociate intermolecular hydrogen bonds to once give a colloidal solution, and the colloidal solution is returned again to cellulose molecules to reaggregate or reassemble polymer molecules to thereby regenerate a fiber. The resulting cellulose fiber can have arbitrary length and shape. The viscose process can therefore give continuous fibers (monofilaments) that are unavailable in natural fibers.

The viscose process probably proceeds according to a reaction scheme as follows. Cellulose is treated with sodium hydroxide to form "alkali cellulose" in which a hydroxyl group at the 6-position of cellulose forms a sodium salt.

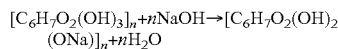

The alkali cellulose is mixed with carbon disulfide and left stand to form sodium cellulose xanthate, which loses intermolecular hydrogen bonds, to thereby be dissolved and form a colloidal solution.

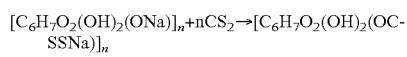

This is a yellow viscous liquid, just like the name implies ("xantho" in Greek refers to "yellow") and is called "viscose." The colloidal solution eventually becomes a reddish brown viscous colloid. The viscose is extruded from a small opening into diluted sulfuric acid for wet spinning. In this step, sodium cellulose xanthate is returned to cellulose and is regenerated as a cellulose fiber by the action of intermolecular hydrogen bonds.

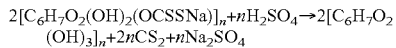

This is viscose rayon. The viscose, when extruded from a thin slit into a film, gives cellophane.

The so-called viscose process, as employing carbon disulfide for cellulose dissolution, disadvantageously suffers from fire risk caused by carbon disulfide and experiences the formation of large amounts of waste liquids (Disadvantage 1).

The viscose process also significantly disadvantageously suffers from reduction in molecular weight of the regenerated cellulose obtained. Specifically, cellulose such as pulp is immersed in a concentrated alkaline solution to form alkali cellulose, compressed and pulverized, and then fed to a ripening step. In the ripening step, the alkali cellulose is oxidized and disintegrated so as to have a decreased average degree of polymerization. The average degree of polymerization herein is generally decreased to the range of from about 300 to about 400. During this process, the distribution of degree of polymerization varies and is uniformized so that components with high degree of polymerization decrease, whereas components with low degree of polymerization accumulate (increase). This phenomenon remarkably occurs particularly in a cellulose source which includes a crystalline region and an amorphous region clearly distinguished from each other, in which oxidative cleavage of glucosidic bonds initially occurs in the amorphous region. Specifically, the disintegration herein is not a random disintegration. This causes distribution of the degree of polymerization (Disadvantage 2).

Independently, there has been known techniques of dissolving cellulose without such chemical modification as in the viscose process. In these techniques, cellulose itself is dissolved in a solvent to form a cellulose solution (dope) and the cellulose solution is spun to form fibers represented by Lyocell. Lyocell was developed and first manufactured for test production in 1988 by Courtaulds Fibres in UK. Lyocell is produced by dissolving a cellulose source in an aqueous N-methylmorpholine N-oxide solution to give a spinning solution called "dope," and extruding the dope into a dilute solution of N-methylmorpholine N-oxide to give a Lyocell fiber.

The Lyocell fiber is produced without undergoing derivatization or another similar process, thereby less suffers from reduction in degree of polymerization of cellulose molecules, avoids Disadvantage 2, and has superior strengths. However, the Lyocell fiber undergoes a liquid crystal state during spinning, includes molecules being highly aligned longitudinally in the fiber, and often disadvantageously suffers from fibrillation in which the fiber tears longitudinally in the fiber axis direction (Disadvantage 3). The Lyocell fiber disadvantageously has rough and coarse touch and is generally hardly usable without further treatment. To prevent Lyocell fibrillation, various techniques have been proposed, but have failed to be fundamental improvements. In addition, the process to produce Lyocell employs N-methylmorpholine N-oxide (NMMO) and disadvantageously causes environmental issues as with Disadvantage 1.

Cellulose includes linear chains of glucose units, forms a semi-crystalline structure, and has a network structure of highly hydrophobic bonds. Cellulose is insoluble in water and most of regular solvents. Cellulose and derivatives thereof are derived from wood or cotton and are used as bioregenerative chemical materials. Exemplary chemical processes for obtaining cellulose derivatives include oxidation, decomposition, hydrolysis, esterification, alkylation, and copolymerization. Examples of such chemical processes include acetylation, acetylation-propionylation, acetylation-butyrylation, nitration, carboxymethylation, ethylation, and hydroxyethylation. Non-derivatized cellulose is soluble only in limited solvents such as alkylpyrrolidone halides.

There have recently been proposed techniques of using ionic liquids for cellulose dissolution. Non Patent Literature (NPL) 1 (Electrochemical Society Proceedings Volume 2002-19, 155-164) reports a technique of employing, as an ionic liquid, a salt with an 1-alkyl-3-methylimidazole as a cation, and dissolving cellulose in the ionic liquid. More specifically, the technique gives a 10% cellulose solution by heating the 1-alkyl-3-methylimidazole chloride and cellulose at 100° C. The solution exhibits anisotropic optical properties under observation using crossed Nicols, indicating that the solution is in a liquid crystalline phase. The solution, as being in a liquid crystalline phase, causes a disadvantage as with Disadvantage 3. The ionic liquids are expensive. Of the ionic liquids, those employing chlorides disadvantageously cause corrosion of production facilities, because the chlorides contaminate the recovered solution and collected cellulose. In addition, when cellulose is esterified after dissolving the same in an ionic liquid, water is inevitably by-produced, and the separation of water from the ionic liquid requires huge energy, resulting in a heavy environmental load (Disadvantage 4). Furthermore, the resulting cellulose obtained by heating disadvantageously undergoes a color change (Disadvantage 5).

Patent Literature (PTL) 1 (Japanese Unexamined Patent Application Publication (JP-A) No. 2008-50595) discloses a solvent for cellulose dissolution, which solvent includes an imidazolium carboxylate or another ionic liquid and a specific amount of water. Even this solvent, however, requires heating for cellulose dissolution.

There have also been known techniques for dissolving cellulose in ionic liquids without heating. NPL 2 (Green Chem., 2010, 12, 1274-1280) reports that an 1-ethyl-3-methylimidazolium alkyl phosphate, when used as an ionic liquid, dissolves cellulose therein and gives a 10 percent by weight cellulose solution without cellulose decomposition by stirring at 45° C. for 30 minutes. The dissolution is accelerated by heating the mixture to 70° C. This ionic liquid is neither volatilized nor thermally decomposed until it reaches 250° C., and can resist long-term heating at 100° C.

In addition, there have been proposed techniques of dissolving cellulose in ionic liquids and subjecting the resulting cellulose solutions to derivatization such as acetylation. Typically, PTL 2 (U.S. Pat. No. 8,166,267) discloses a technique of dissolving cellulose in an ionic liquid and subjecting the resulting cellulose solution to acetylation. These techniques, however, still fail to solve Disadvantage 4.

Independently, a core-shell structured cellulose ester-cellulose composite has received attention as a functional polymeric material. Exemplary known techniques for producing a core-shell structured cellulose ester-cellulose composite include a technique of preparing a solid of cellulose acetate, and hydrolyzing the solid of cellulose acetate in the presence typically of a sulfuric acid catalyst. This technique hydrolyzes the surface of the cellulose ester shaped article and gives a composite as a core-shell structured cellulose ester-cellulose composite including cellulose as the surface layer (shell) and the cellulose ester as the core.

There has been also disclosed a technique of heterogeneous acetylation so as to produce cellulose esters, particularly cellulose acetate. This technique includes esterifying beaten pulp or another cellulose source in the presence of an esterification catalyst to produce cellulose acetate having a desired degree of substitution without obtaining primary cellulose. The technique may give a composite including a cellulose ester as the surface (shell) and cellulose as the core. The technique, however, fails to give a core-shell structured cellulose-cellulose ester composite typically in the form of a monofilament because the technique can employ only a solid cellulose source (e.g., beaten pulp) processed from naturally occurring materials such as wood.

In addition, customary techniques for producing a cellulose ester from cellulose disadvantageously fail to remove sulfuric esters completely from the resulting cellulose ester. Exemplary known cellulose sources include wood pulp and cotton linters. Cellulose in these materials has a crystal structure called "cellulose I." Techniques of esterifying cellulose having the crystal structure cellulose I are well known. Assume that cellulose having the crystal structure cellulose I is acetylated, where acetylation is most easily performed among esterification processes. Even in this case, acetylation of cellulose in the crystalline region requires as an acetylating agent not a regular acetylating agent, but acetic sulfuric anhydride obtained through reaction between catalyst sulfuric acid and acetic anhydride. For this reason, even acetylation, through which esterification is easily performed, essentially requires such sulfuric acid catalyst for the acetylation of cellulose in the crystalline region. Still more, propionylation reaction according to the customary technique cannot proceed by using large-molecule propionic anhydride alone, but further requires acetic sulfuric anhydride, and results in a cellulose ester of mixed fatty acids, i.e., cellulose acetate propionate.

The use of such sulfuric acid catalyst in the processes for producing a cellulose ester from cellulose is known to cause sulfuric esterification (sulfation) of part of the cellulose ester molecules. The resulting sulfuric ester is known to act as a hydrolysis catalyst during the storage of the cellulose ester. To prevent this, various attempts have been made for the removal of the sulfuric ester (combined sulfuric acid) in cellulose ester production. Such customary techniques, however, disadvantageously fail to remove the sulfuric ester completely from the product cellulose ester (Disadvantage 6). NPL 3 (Kogyo Kagaku Zasshi (in Japanese; Journal of the Chemistry Society of Japan), 1941, 44, 16-22) describes that the hydrolysis of sulfuric ester groups in cellulose acetate to a content of significantly lower than 0.1 percent by weight is remarkably difficult or impossible.

CITATION LIST

Patent Literature

PTL 1: Japanese Unexamined Patent Application Publication (JP-A) No. 2008-50595
PTL 2: U.S. Pat. No. 8,188,267

Non Patent Literature

NPL 1: Electrochemical Society Proceedings Volume 2002-19, 155-164
NPL 2: Green Chem., 2010, 12, 1274-1280
NPL 3: Kogyo Kagaku Zasshi (in Japanese; Journal of the Chemistry Society of Japan), 1941, 44, 16-22

SUMMARY OF INVENTION

Technical Problem

Accordingly, an object of the present invention is to provide solid cellulose such as a cellulose solidified article or a cellulose shaped article from a cellulose solution without causing environmental issues such as discharge of large amounts of waste liquids and consumption of a great deal of energy.

Another object of the present invention is to provide solid cellulose from a cellulose solution without causing molecular weight reduction, decomposition, reduction in mechanical strengths such as tear strength, and coloring.

Yet another object of the present invention is to provide a process capable of preparing a cellulose solution at a low temperature within a short time and capable of producing, from the prepared cellulose solution, solid cellulose that mainly includes amorphous cellulose and can easily undergo derivatization (e.g., esterification).

Still another object of the present invention is to provide a process for industrially efficiently producing a good-quality cellulose ester from cellulose without causing significant environmental issues.

Another object of the present invention is to provide a process for industrially efficiently producing a cellulose ester from cellulose, which cellulose ester includes substantially no or, if any, an extremely trace amount of combined sulfuric acid.

Yet another object of the present invention is to provide a core-shell structured cellulose-cellulose ester composite with good quality, which composite includes a cellulose ester as the surface layer (shell) and cellulose as the core.

Solution to Problem

After intensive investigations to achieve the objects, the present inventors have found that a specific aqueous onium hydroxide, when used, enables prompt dissolution of cellulose under mild conditions to give a cellulose solution; the resulting cellulose solution can give good-quality solid cellulose such as a cellulose solidified article or a cellulose shaped article without causing disadvantages such as molecular weight reduction and decomposition; that the solid cellulose is mainly amorphous, includes, if any, a small amount of crystals of cellulose II crystal structure and can be very easily derivatized, and, for example, cellulose esterification does not particularly require a sulfuric acid catalyst and can give a cellulose ester including substantially no combined sulfuric acid; and that a high-quality core-shell structured cellulose-cellulose ester composite including a cellulose ester as the surface layer (shell) and cellulose as the core can be easily produced. The present invention has been made based on these findings and further investigations. One of the present inventors has disclosed that a solvent including a quaternary phosphonium hydroxide or quaternary ammonium hydroxide dissolves cellulose therein (Chem. Commun., 2012, 48, 1808-1810).

Specifically, the present invention provides, in one embodiment, a process for producing a solid cellulose. This process includes the steps of: (A) dissolving cellulose in a solvent (s1) to give a cellulose solution, where the solvent (s1) includes at least one onium hydroxide in a content of from 45 to 85 percent by weight and water in a content of from 15 to 55 percent by weight based on the total weight of the solvent (s1), and the at least one onium hydroxide is selected from the group consisting of quaternary phosphonium hydroxides and quaternary ammonium hydroxides; (B) bringing the cellulose solution obtained in Step (A) into contact with a poor solvent (s2) to precipitate cellulose as a cellulose solidified article; and (C) separating and collecting the cellulose solidified article precipitated in Step (B).

In Step (B), the cellulose solution obtained in Step (A) may be stirred and mixed with a poor solvent (s2) to precipitate cellulose in the form of flakes.

The process may further include, between Step (B) and Step (C), the step of (B') adding an organic solvent (s3) to a mixture obtained from Step (B) and separating the resulting mixture into an upper layer and a lower layer, where the organic solvent (s3) is separable from water and has a specific gravity higher than that of water and lower than that of cellulose, the upper layer mainly includes water, and the lower layer mainly includes the organic solvent (s3) and further includes the cellulose flakes precipitated at the bottom, in which Step (C) includes separating and collecting the cellulose flakes together with, or separately from, a liquid constituting the lower layer.

The present invention provides, in another embodiment, a process for producing a solid cellulose. This process includes the steps of: (A) dissolving cellulose in a solvent (s1) to give a cellulose solution, where the solvent (s1) includes at least one onium hydroxide in a content of from 45 to 85 percent by weight and water in a content of from 15 to 55 percent by weight based on the total amount of the solvent (s1), and the at least one onium hydroxide is selected from the group consisting of quaternary phosphonium hydroxides and quaternary ammonium hydroxides; and (D) introducing the cellulose solution obtained in Step (A) into a poor solvent (s2) using a discharger to coagulate cellulose to thereby give a cellulose shaped article.

In the process for producing a solid cellulose, the resulting cellulose shaped article may be in the form of a fiber, a film, or granules or particles.

In the processes for producing a solid cellulose according to the embodiments, the solvent (s1) preferably contains the onium hydroxide in a content of from 50 to 80 percent by weight; and water in a content of from 20 to 50 percent by weight. The solvent (s1) more preferably contains the onium hydroxide in a content of from 50 to 70 percent by weight; and water in a content of from 30 to 50 percent by weight.

The onium hydroxide is preferably at least one selected from tetrabutylphosphonium hydroxide and tetrabutylammonium hydroxide.

The poor solvent (s2) is preferably an organic solvent having a boiling point lower than that of water.

The organic solvent having a boiling point lower than that of water is preferably at least one selected from the group consisting of methanol, ethanol, 2-propanol, and acetone.

The present invention provides, in yet another embodiment, a process for producing a cellulose ester. This process includes the steps of: (A) dissolving cellulose in a solvent (s1) to give a cellulose solution, where the solvent (s1) includes at least one onium hydroxide in a content of from 45 to 85 percent by weight and water in a content of from 15 to 55 percent by weight based on the total weight of the solvent (s1), and the at least one onium hydroxide is selected from the group consisting of quaternary phosphonium hydroxides and quaternary ammonium hydroxides; (B) bringing the cellulose solution obtained in Step (A) into contact with a poor solvent (s2) to precipitate cellulose as a cellulose solidified article; (C) separating and collecting the cellulose solidified article precipitated in Step (B); (E) bringing the cellulose solidified article separated and collected in Step (C) into contact with an esterifying agent in a solvent to form a cellulose ester; and (F) separating and collecting the cellulose ester formed in Step (E).

In Step (B) in the process for producing a cellulose ester, the cellulose solution may be mixed with the poor solvent (s2) with stirring to precipitate cellulose in the form of flakes (cellulose flakes).

The process may further include, between Step (B) and Step (C), the step of (B') adding an organic solvent (s3) to a mixture obtained from Step (B) and separating the resulting mixture into an upper layer and a lower layer, where the organic solvent (s3) is separable from water and has a specific gravity higher than that of water and lower than that of cellulose, the upper layer mainly includes water, and the lower layer mainly includes the organic solvent (s3) and further includes the cellulose flakes precipitated at the bottom, in which, the cellulose flakes may be separated and collected in Step (C) together with, or separately from, a liquid constituting the lower layer.

In Step (B), the cellulose solution obtained in Step (A) may be introduced into the poor solvent (s2) using a discharger to precipitate cellulose in the form of a monofilament.

In Step (B), the cellulose solution obtained in Step (A) may be added dropwise to the poor solvent (s2) using a discharger to precipitate cellulose in the form of granules or particles.

The esterifying agent for use in Step (E) is preferably a carboxylic anhydride.

In Step (E), the cellulose solidified article separated and collected in Step (C) may be brought into contact with the esterifying agent in a poor solvent for the target cellulose ester.

In addition and advantageously, the present invention provides a cellulose-cellulose ester composite produced by the process just mentioned above and having a core-shell structure including a cellulose ester as the shell (surface layer); and cellulose as the core, where in Step (E) in the process, the cellulose solidified article separated and collected in Step (C) is brought into contact with the esterifying agent in a poor solvent for the target cellulose ester.

Advantageous Effects of Invention

The present invention employs the specific aqueous onium hydroxide for cellulose dissolution and is free from such fire risk as in the viscose process using carbon disulfide. The present invention employs the solvent for cellulose dissolution, which is easily recoverable and can solve such environmental issues, e.g., formation of large amounts of waste liquids and consumption of a great deal of energy, as in the viscose process and the N-methylmorpholine N-oxide (HMMO) process. The present invention enables cellulose dissolution under mild conditions within a very short time and enables industrially efficient production of a solid cellulose, such as a cellulose solidified article or a cellulose shaped article, which is substantially free from coloring. In addition, the present invention does not cause molecular weight reduction and decomposition of cellulose during cellulose solution preparation and cellulose shaping and enables production of a solid cellulose, such as a cellulose solidified article or a cellulose shaped article, with high and uniform quality. The cellulose (solid cellulose) produced according to the present invention does not undergo a liquid crystalline state during spinning, unlike the N-methylmorpholine N-oxide (HMMO) process, and provides a shaped article that is substantially free from the disadvantage of susceptibility to tearing.

According to the present invention, the aqueous onium hydroxide acts so as to break the cellulose hydrogen bond network and to disentangle the cellulose chains to a molecular level. The cellulose solution in this state is coagulated (solidified) by the action of a poor solvent. Cellulose herein is rapidly quenched through coagulation and mostly becomes an amorphous phase, in which part of cellulose may be crystallized but has a crystal structure of cellulose II. This enables very easy derivatization of the resulting solid cellulose typically through an esterification reaction. For example, in general-use cellulose sources such as wood pulp and cotton linters, cellulose is present as the crystal structure cellulose I. Acylation such as acetylation, when using any of the general-use cellulose source, requires sulfuric acid as a catalyst. In contrast, the solid cellulose obtained by the process according to the present invention is mostly present as amorphous cellulose and includes crystals, if any, of cellulose II. The solid cellulose can therefore give, for example, cellulose acetate having a desired degree of acetylation (acetyl substitution) even in the absence of sulfuric acid. This enables the production of a cellulose acylate (e.g., cellulose acetate) having a desired degree of acylation (e.g., degree of acetylation) and enables the production of such a cellulose acylate as to contain substantially no or, if any, a trace amount of combined sulfuric acid (in a content of significantly less than 0.1 percent by weight). The cellulose acylate containing substantially no combined sulfuric acid is free typically from hydrolysis even during long-term storage and can stably maintain desired quality over the long term. The present invention, when employing another acylation than acetylation, enables the production of not a cellulose ester of mixed fatty acids (e.g., cellulose acetate propionate) but a cellulose ester of a single fatty acid (e.g., cellulose propionate).

The present invention enables the esterification from surface of a solid cellulose, such as a cellulose solidified article or a cellulose shaped article, to which an arbitrary shape is given. The esterification reaction, when not completed but discontinued at a desired stage (e.g., at a desired degree of substitution), enables easy and short-time production of a core-shell structured cellulose-cellulose ester composite including a cellulose ester as the shell (surface layer), and cellulose as the core. As is described above, the solid cellulose to be subjected to the reaction in the present invention is mostly present as amorphous cellulose and includes crystals, if any, of cellulose II. Unlike the use of cellulose I derived from the general-use cellulose sources, the reaction herein can uniformly and rapidly proceed inward to give a core-shell structured cellulose-cellulose ester composite having an extremely well-ordered (e.g., satisfactorily symmetric) structure.

BRIEF DESCRIPTION OF DRAWINGS

FIG. 1 is a schematic diagram illustrating a spinning/film-forming apparatus used in Examples and Comparative Examples.

DESCRIPTION OF EMBODIMENTS

Solid Cellulose Production-1: Cellulose Solidified Article

A solid cellulose production process according to a first embodiment of the present invention includes the steps of: (A) dissolving cellulose in a solvent (s1) to give a cellulose solution, where the solvent (s1) includes at least one onium hydroxide in a content of from 45 to 85 percent by weight and water in a content of from 15 to 55 percent by weight based on the total weight of the solvent (s1), and the at least one onium hydroxide is selected from the group consisting of quaternary phosphonium hydroxides and quaternary ammonium hydroxides; (B) bringing the cellulose solution obtained in Step (A) into contact with a poor solvent (s2) to precipitate cellulose as a cellulose solidified article; and (C) separating and collecting the cellulose solidified article precipitated in Step (B).

The quaternary phosphonium hydroxides and quaternary ammonium hydroxides are preferably compounds represented by Formula (1) as follows. Each of different onium hydroxides may be used alone or in combination.

[Chem. 1]

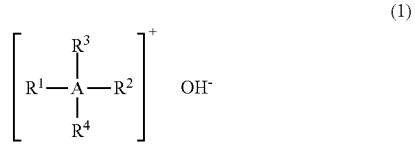

(1)

In Formula (1), A represents phosphorus atom or nitrogen atom; and each of $R^1$, $R^2$, $R^3$, and $R^4$ independently represents a straight or branched chain alkyl group having 1 to 10 carbon atoms, a hydroxyalkyl group having 1 to 10 carbon atoms, an alkoxyalkyl group having 2 to 10 carbon atoms, an aralkyl group having 7 to 19 carbon atoms, an aryl group having 6 to 18 carbon atoms, or a hydroxyaryl group having 6 to 18 carbon atoms, each of which may have one or more substituents.

The straight or branched chain alkyl group having 1 to 10 carbon atoms is exemplified by methyl, ethyl, propyl, isopropyl, butyl, isobutyl, pentyl, hexyl, octyl, and decyl groups. The hydroxyalkyl group having 1 to 10 carbon atoms is exemplified by 2-hydroxyethyl, 2-hydroxypropyl, 3-hydroxypropyl, 4-hydroxybutyl, 5-hydroxypentyl, and 6-hydroxyhexyl groups. The alkoxyalkyl group having 2 to 10 carbon atoms is exemplified by 2-methoxyethyl, 2-ethoxyethyl, 3-methoxypropyl, 3-ethoxypropyl, 4-methoxybutyl, 4-ethoxybutyl, 5-methoxypentyl, and 6-methoxyhexyl groups. The aralkyl group having 7 to 19 carbon atoms is exemplified by benzyl, 1-phenylethyl, 2-phenylethyl, 3-phenylpropyl, and 4-phenylbutyl groups. The aryl group having 6 to 18 carbon atoms is exemplified by phenyl and naphthyl groups. The hydroxyaryl group having 6 to 18 carbon atoms is exemplified by hydroxyphenyl and hydroxynaphthyl groups.

Among them, preferred are straight or branched chain alkyl groups having 2 to 8 carbon atoms (more preferably those having 2 to 6 carbon atoms); hydroxyalkyl groups having 2 to 8 carbon atoms (more preferably those having 2 to 6 carbon atoms); alkoxyalkyl groups having 2 to 8 carbon atoms (more preferably those having 2 to 6 carbon atoms); aralkyl groups having 7 to 13 carbon atoms; aryl groups having 6 to 10 carbon atoms; and hydroxyaryl groups having 6 to 10 carbon atoms.

The substituents are exemplified by $C_{1-6}$ alkyl groups, $C_{1-6}$ alkoxy groups, amino group, mono- or di-($C_{1-4}$ alkyl) amino groups, and nitro group.

Representative examples of the quaternary phosphonium hydroxides include tetraalkylphosphonium hydroxides whose alkyl moieties each having 2 to 8 carbon atoms, such as tetraethylphosphonium hydroxide, tetrapropylphosphonium hydroxide, tetrabutylphosphonium hydroxide, tetrapentylphosphonium hydroxide, and tetrahexylphosphonium hydroxide; tetraphenylphosphonium hydroxide; and substituted or unsubstituted alkyltriphenylphosphonium hydroxides such as ethyltriphenylphosphonium hydroxide, butyltriphenylphosphonium hydroxide, pentyltriphenylphosphonium hydroxide, 2-dimethylaminoethyltriphenylphosphonium hydroxide, and methoxymethyltriphenylphosphonium hydroxide. Among them, preferred are at least one selected from the group consisting of tetraethylphosphonium hydroxide, tetrapropylphosphonium hydroxide, tetrabutylphosphonium hydroxide, and tetrapentylphosphonium hydroxide; of which tetrabutylphosphonium hydroxide is especially preferred.

Representative examples of the quaternary ammonium hydroxides include tetraalkylammonium hydroxides whose alkyl moieties each having 2 to 6 carbon atoms, such as tetraethylammonium hydroxide, tetrapropylammonium hydroxide, tetrabutylammonium hydroxide, and tetrapentylammonium hydroxide. Among them, tetrabutylammonium hydroxide is especially preferred.

The solvent (s1) contains the at least one onium hydroxide in a content of from 45 to 85 percent by weight; and water in a content of from 15 to 55 percent by weight. The solvent (s1), if containing the onium hydroxide and water in contents out of the above-specified range, may exhibit inferior cellulose solubility, and this may impede the preparation of a homogeneous solution having a high cellulose concentration on some level. The solvent (s1) preferably contains the onium hydroxide in a content of from 50 to 80 percent by weight and water in a content of from 20 to 50 percent by weight; and more preferably contains the onium hydroxide in a content of from 50 to 70 percent by weight and water in a content of from 30 to 50 percent by weight.

In Step (A), cellulose is dissolved in the solvent (s1). The material cellulose for use herein is exemplified by, but not limited to, cellulose sources including crystalline cellulose (microcrystalline cellulose); wood pulps (e.g., softwood pulps and hardwood pulps); and linter pulps (e.g., cotton linter pulps). The pulps as mentioned above generally contain hemicellulose and other components different from cellulose. As used herein the term "cellulose" therefore also refers to and includes hemicellulose and such other components. The wood pulp for use herein can be at least one selected from the group consisting of a hardwood pulp and a softwood pulp and may be a combination of them. The material cellulose may also be a combination of a linter pulp (e.g., purified cotton linters) and a wood pulp. The material cellulose may have any degree of polymerization. One having a degree of polymerization of typically from about 200 to about 10000 may be used. The α-cellulose content of the material cellulose indicates cellulose's degree of crystallinity. The cellulose can have any arbitrary α-cellulose content (in weight percent). Typically, cellulose having a high degree of crystallinity of typically 90% or more, and particularly 98% or more, can be used herein. The cellulose for use herein may contain some carboxyl groups typically as combined with the cellulose molecule and/or hemicellulose molecule.

The present invention employs the solvent (s1) having the specific composition and thereby enables immediate dissolution of cellulose by stirring under mild temperature conditions at a temperature of typically from 5° C. to 60° C., preferably from 10° C. to 45° C., and particularly preferably around room temperature (25° C.) (e.g., from 15° C. to 40° C.). The time necessary for dissolution may vary depending typically on the material cellulose type. For example, microcrystalline cellulose may be dissolved within a time of from about 0.5 to about 30 minutes, whereas softwood sulfite pulp, hardwood prehydrolysis kraft pulp, and cotton linters may be dissolved within a time of from about 5 to about 15 hours.

The cellulose solution prepared in the above manner may have a cellulose concentration of typically from about 1 to about 25 percent by weight, and preferably from about 3 to about 23 percent by weight. A cellulose solution having a cellulose concentration of more than 25 percent by weight may be hardly prepared because of excessively high viscosity.

The cellulose solution, when subjected to $^1$H-NMR measurement, has a hydroxide anion/water peak that shifts toward lower magnetic fields with an increasing cellulose concentration. This indicates that the hydroxide anion (OH$^-$) of the onium hydroxide interacts with the proton of cellulose's hydroxyl groups in the cellulose solution.

In Step (B), the cellulose solution obtained in Step (A) is brought into contact with a poor solvent (s2) to precipitate cellulose. The poor solvent (s2) is not limited, as long as being a poor solvent for cellulose, and can be any of known organic solvents. Among them, preferred is an organic solvent having a boiling point (at normal atmospheric pressure) lower than that of water, because the poor solvent (s2) of this type can be easily separated from the solvent (s1) and removed through distillation after use. Typically from the viewpoint of miscibility with the solvent (s1), the poor solvent (s2) is preferably a hydrophilic organic solvent. The hydrophilic organic solvent is exemplified by a solvent having a solubility of 3 g or more in 100 g of water at 20° C.

Of such poor solvents (s2), preferred examples are alcohols having 1 to about 4 carbon atoms, such as methanol, ethanol, and 2-propanol; and ketones such as acetone. Each of different poor solvents (s2) may be used alone or in combination.

When cellulose is dissolved in the solvent (s1) (aqueous onium hydroxide) and the resulting cellulose solution is brought into contact with the poor solvent (s2), the onium hydroxide and water elute into the poor solvent to form a mixture of the onium hydroxide, water, and the poor solvent. The poor solvent can be easily separated and removed from this mixture by distillation. The onium hydroxide and water after the removal of the poor solvent can be reused as a solvent for cellulose dissolution. In a preferred embodiment as mentioned above, an organic solvent having a boiling point lower than that of water is used as the poor solvent (s2). This embodiment is particularly preferred from the viewpoint of energy saving, because the poor solvent alone can be distilled off without evaporation of water.

The contact between the cellulose solution obtained in Step (A) and the poor solvent (s2) may be performed at a temperature of typically from 0° C. to 95° C., preferably from 5° C. to 70° C., more preferably from 10° C. to 60° C., and particularly preferably from 10° C. to 40° C.

The cellulose solution obtained in Step (A) is brought into contact with the poor solvent (s2) to precipitate a cellulose solidified article. The cellulose solidified article, when collected by filtration and subjected to X-ray diffractometry, is found to be amorphous (which may partially include cellulose II crystals). When a microcrystalline cellulose having an average molecular weight of $9\times10^4$ is used as the material cellulose, the precipitated cellulose solidified article has a decomposition temperature of 260° C. In contrast, the microcrystalline cellulose having an average molecular weight of $9\times10^4$ used as the material has a crystal structure of cellulose I and has a decomposition temperature of 320° C. This indicates that the solvent (s1) (aqueous onium hydroxide) for use in the present invention probably functionally breaks the cellulose's hydrogen bond network and disentangles the cellulose chains to a molecular level (breaks the cellulose microfibril arrangement during dissolution). A Fourier transform infrared spectroscopy (FT-IR) analysis has revealed that the precipitated cellulose solidified article is not derivatized during this step (Step B). In addition a high performance ionic liquid chromatography (HPILC) has revealed that the precipitated cellulose solidified article has a molecular weight and a molecular weight distribution that are the same as with the material cellulose and do not vary during the step.

In an embodiment, the cellulose solution obtained in Step (A) is mixed with stirring with the poor solvent (s2) in Step (B) to precipitate cellulose in the form of flakes (cellulose flakes). The cellulose flakes are particularly useful as a starting material for cellulose derivatives such as cellulose esters. Specifically, the cellulose flakes are mostly amorphous, include, if any, a crystalline region of cellulose II crystal structure, and can undergo derivatization such as esterification much more easily than a general-use cellulose source of cellulose I does. Typically, this significantly reduces the amount of the sulfuric acid catalyst through regulation of the esterification temperature and esterification time, or allows the esterification (acylation) to proceed smoothly even without the use of sulfuric acid at all. When cellulose acetate is to be produced, the esterification reaction proceeds smoothly even without the use of sulfuric acid, and this allows the resulting cellulose acetate to be substantially free from combined sulfuric acid. When a cellulose ester other than cellulose acetate is to be produced, cellulose propionate or another cellulose ester that is not an ester of mixed fatty acids but an ester of a single fatty acid can be easily produced.

In an embodiment, the process further includes Step (B') subsequent to Step (B). In Step (B'), an organic solvent (s3) (hydrophobic organic solvent) is added to a mixture obtained from Step (B), and the resulting mixture is separated into an upper layer mainly containing water, and a lower layer mainly containing the organic solvent (s3) and further containing cellulose flakes precipitated at the bottom, where the organic solvent (s3) is separable from water and has a specific gravity higher than that of water and lower than that of cellulose. In this embodiment, the cellulose flakes may be separated and collected together with, or separately from, a liquid constituting the lower layer in Step (C). In this embodiment, the poor solvent (s2) for use in Step (B) is preferably a hydrophilic organic solvent (e.g., methanol, ethanol, or acetone) in view of separability in the subsequent step (Step (B')).

The organic solvent (s3) (hydrophobic organic solvent) is exemplified by chloroform and methylene chloride.

In the embodiment, the cellulose solid (cellulose flakes) is precipitated at the bottom of the lower layer. The upper layer is a mixture of the onium hydroxide, water, and the poor solvent (s2) (hydrophilic organic solvent); whereas the liquid constituting the lower layer is a mixture of the organic solvent (s3) (hydrophobic organic solvent) with trace amounts of water and the poor solvent (s2) (hydrophilic organic solvent) dissolved in the organic solvent (s3) within the limits of their solubilities. The cellulose flakes may be separated from the lower layer and be subjected typically to an esterification step. Alternatively, the cellulose flakes may be subjected together with the lower layer liquid typically to an esterification step without separation. In the latter case, the solvent in the lower layer may be used as intact as an esterification solvent.

Specifically, Step (B') may be performed subsequent to Step (B) typically by an operation, in which the hydrophobic organic solvent (s3) is added to a mixture of the poor solvent (s2) (preferably a hydrophilic organic solvent) and the precipitated cellulose, the resulting mixture is vigorously stirred, and, where necessary, subjected to centrifugal separation to precipitate cellulose flakes at the bottom of the hydrophobic organic solvent (s3).

In Step (C), the cellulose solidified article precipitated in Step (B) is separated and collected. The separation and collection of the cellulose solidified article may be performed according to any of known or customary procedures such as filtration, centrifugal separation, and drying.

Solid Cellulose Production-2: Cellulose Shaped Article

A solid cellulose production process according to a second embodiment of the present invention includes the steps of: (A) dissolving cellulose in a solvent (s1) to give a cellulose solution, where the solvent (s1) includes at least one onium hydroxide in a content of from 45 to 85 percent by weight and water in a content of from 15 to 55 percent by weight based on the total amount of the solvent (s1), and the at least one onium hydroxide is selected from the group consisting of quaternary phosphonium hydroxides and quaternary ammonium hydroxides; and (D) introducing the cellulose solution obtained in Step (A) into a poor solvent (s2) using a discharger to coagulate or solidify cellulose to thereby give a cellulose shaped article.

Step (A) is as described above. In Step (D), the cellulose solution obtained in Step (A) is introduced into a poor solvent (s2) using a discharger to coagulate or solidify cellulose in the poor solvent. This can give a cellulose solid with better quality. Specifically, the cellulose solution obtained in Step (A) is extruded through a head (die head) such as nozzle into the poor solvent (s2) and yields a cellulose shaped article that is substantially free from molecular weight reduction and coloring. The process can produce a cellulose shaped article with a desired shape, such as a fibrous (filamentous) or film-like cellulose shaped article, by suitably changing dimensions or other conditions of the discharger such as a head (die head). The process according to the present invention enables easy production particularly of cellulose in the form of a monofilament. The process can also give cellulose in the from of granules or particles by adding the cellulose solution dropwise to the poor solvent (s2).

In an embodiment, the poor solvent (s2) is an organic solvent having a boiling point lower than that of water (volatile organic solvent). This embodiment facilitates recycling of components as mentioned above and significantly reduces the amounts of waste liquids.

According to the present invention, the material cellulose is dissolved in the solvent (s1) to give a cellulose solution in which the cellulose chains are disentangled to a molecular level, and the cellulose solution is introduced into the poor solvent to be coagulated, as described above. The cellulose is rapidly quenched by coagulation and mostly becomes an amorphous phase and includes crystals, if any, of cellulose II. The resulting cellulose shaped article can therefore be easily derivatized typically through an esterification reaction.

Cellulose Ester Production

A process for producing a cellulose ester according to an embodiment of the present invention includes the steps of: (A) dissolving cellulose in a solvent (s1) to give a cellulose solution, where the solvent (s1) includes at least one onium hydroxide in a content of from 45 to 85 percent by weight and water in a content of from 15 to 55 percent by weight based on the total weight of the solvent (s1), and the at least one onium hydroxide is selected from the group consisting of quaternary phosphonium hydroxides and quaternary ammonium hydroxides; (B) bringing the cellulose solution obtained in Step (A) into contact with a poor solvent (s2) to precipitate cellulose as a cellulose solidified article; (C) separating and collecting the cellulose solidified article precipitated in Step (B); (E) bringing the cellulose solidified article separated and collected in Step (C) into contact with an esterifying agent in a solvent to form a cellulose ester; and (F) separating and collecting the cellulose ester formed in Step (E).

Steps (A), (B), and (C) are as described above.

In an embodiment of the cellulose ester production process according to the present invention, Step (B) includes introducing the cellulose solution obtained in Step (A) into the poor solvent (s2) using a discharger to precipitate cellulose in the form of a monofilament (cellulose monofilament). In another embodiment, Step (B) includes adding the cellulose solution obtained in Step (A) dropwise to the poor solvent (s2) using a discharger to precipitate cellulose in the form of granules or particles (cellulose granules or particles). In yet another embodiment, Step (B) includes mixing the cellulose solution obtained in Step (A) with the poor solvent (s2) with stirring to precipitate cellulose in the form of flakes (cellulose flakes). The resulting cellulose monofilament, cellulose granules or particles, and cellulose flakes are suitable as material cellulose to be subjected to esterification.

In another embodiment, the process may further include, subsequent to Step (B), Step (B') of adding an organic solvent (s3) to a mixture obtained from Step (B) and separating the resulting mixture into an upper layer and a lower layer, where the organic solvent (s3) is separable from water and has a specific gravity higher than that of water and lower than that of cellulose, the upper layer mainly includes water, and the lower layer mainly includes the organic solvent (s3) and further includes the cellulose flakes precipitated at the bottom. In this embodiment, the cellulose flakes may be separated and collected in Step (C) together with, or separately from, a liquid constituting the lower layer, as described above in the solid cellulose production processes. The resulting cellulose flakes are also usable as a material cellulose to be subjected to esterification.

Step (E) is a cellulose esterification step (acylation step), in which the cellulose solidified article separated and collected in Step (C) is brought into contact with an esterifying agent (acylating agent) in a solvent. The cellulose solidified article herein includes the shaped article and is exemplified by cellulose flakes, cellulose fibers, and cellulose granules or particles.

The solvent for use in the esterification reaction (acylation reaction) can be any of solvents generally used in cellulose esterification reactions and is exemplified by carboxylic acids such as acetic acid; methylene chloride; and chloroform. Each of different solvents may be used alone or in combination.

The esterifying agent can be one corresponding to the target cellulose ester and is exemplified by known esterifying agents including carboxylic anhydrides (anhydrous carboxylic acids) such as acetic anhydride, propionic anhydride, and butyric anhydride; and carboxylic halides such as acetyl chloride and propionyl chloride. Of such esterifying agents, carboxylic anhydrides (anhydrous carboxylic acids) are particularly preferred from the viewpoints typically of reactivity and handleability.

In the esterification reaction, the solvent may be used in an amount not critical, but typically from about 10 to about 1000 parts by weight, and preferably from about 50 to about 600 parts by weight, per 100 parts by weight of the cellulose. The esterifying agent may be used in an amount of typically from about 1.1 to about 4 equivalents, and preferably from about 1.1 to about 2 equivalents, per 1 equivalent of cellulose's hydroxyl groups. The esterifying agent may also be used in an amount of typically from 200 to 400 parts by weight, and preferably from 230 to 350 parts by weight, per 100 parts by weight of the cellulose.

The esterification reaction may employ a catalyst according to necessity. The catalyst for use herein is exemplified by strong acids (of which sulfuric acid is preferred); and acetic acid alkali metal salts, such as potassium acetate and sodium acetate. The catalyst may be used in an amount of typically from about 0.1 to about 20 parts by weight, and preferably from about 1 to about 15 parts by weight, per 100 parts by weight of the cellulose. The present invention employs, as cellulose to be subjected to reaction, cellulose that is mostly amorphous and includes, if any, a crystalline region of cellulose II. This enables esterification (particularly acetylation) of cellulose even without the use of a catalyst.

The esterification reaction may be performed at a temperature of typically from 0° C. to 55° C., and preferably from 20° C. to 50° C. The reaction temperature may be constant or varied. Typically, the reaction temperature may be elevated gradually, or may be elevated stepwise (step by step).

The process may further include an activation step (or pretreatment step) of activating cellulose before the esterification reaction.

After the completion or termination of esterification reaction, a quenching agent (reaction terminating agent) may be added to the reaction system to deactivate (to quench) the esterifying agent remained in the reaction system. The quenching agent can be any one capable of deactivating the esterifying agent and generally often includes at least water. A neutralizer may also be used as the quenching agent. The neutralizer for use herein is exemplified by basic substances including an alkali metal or alkaline earth metal. The neutralizer neutralizes the catalyst (e.g., sulfuric acid) entirely or partially.

The process may further include the step of ripening (hydrolysis step) after the completion or termination of esterification reaction so as to control the degree of acyl substitution of the formed cellulose ester. The ripening step may employ the addition of any of components such as a ripening catalyst (e.g., sulfuric acid), a solvent (e.g., a carboxylic acid), and water according to necessity. The ripening reaction can be stopped typically by the addition of the neutralizer.

In an embodiment, Step (E) is performed by bringing the cellulose solidified article separated and collected in Step (C) (e.g., cellulose flakes) into contact with the esterifying agent in a poor solvent for the target cellulose ester. The poor solvent is exemplified by water; alcohols having 1 to about 4 carbon atoms, such as methanol, ethanol, and 2-propanol; and ketones such as acetone. Each of different poor solvents may be used alone or in combination. The esterification reaction, when not completed but terminated at a desired degree of substitution under the conditions as mentioned above, can give a core-shell structured cellulose-cellulose ester composite including a cellulose ester as the shell (surface layer) and cellulose as the core.

As is described above, the present invention employs a solid cellulose to be subjected to esterification, which solid cellulose is mostly present as amorphous cellulose and includes crystals, if any, of cellulose II. This allows the reaction (esterification) to proceed inward uniformly and rapidly, unlike the use of general-use cellulose source of cellulose I. The present invention can therefore give a core-shell structured cellulose-cellulose ester composite having an extremely well-ordered structure (e.g., highly symmetric structure).

The resulting core-shell structured cellulose-cellulose ester composite is usable typically as a carrier for drug sustained release (sustained-release drug carrier).

In Step (E), the reaction product may be separated and purified by a customary separation/purification procedure such as pH control, crystallization, precipitation, filtration, centrifugal separation-water washing, and/or drying.

The process for producing a cellulose ester according to the present invention can produce cellulose esters (e.g., cellulose acetate) including substantially no, or a trace amount (e.g., in a content of significantly less than 0.1 percent by weight) of, combined sulfuric acid. When a cellulose ester other than cellulose acetate is to be produced, the process can also produce an ester of not mixed fatty acids, but a single fatty acid, such as cellulose propionate.

EXAMPLES

The present invention will be illustrated in further detail with reference to several examples below, which are by no means intended to limit the scope of the invention.

Raw materials used in Examples and Comparative Examples are as follows.

Onium Hydroxide
A-1: Tetrabutylphosphonium hydroxide
A-2: Tetrabutylammonium hydroxide
Cellulose
B-1: Crystalline cellulose (trade name "CEOLUS," having a degree of polymerization of 560, supplied by Asahi Kasei Chemicals Corporation)
B-2: Softwood sulfite pulp (having an α-cellulose content of 95% and a degree of polymerization of 2500)
B-3: Hardwood prehydrolysis kraft pulp (having an α-cellulose content of 98.5% and a degree of polymerization of 1800)
B-4: Cotton linter (having a degree of polymerization of 4000)
Poor Solvent
C-1: Ethanol
C-2: Aqueous sulfuric acid solution (3 percent by weight)
C-3: Methanol
C-4: 2-Propanol
C-5: Acetone Examples 1 to 21 and Comparative Examples 1 to 4

Experiments were performed under conditions given in Tables 1 and 2 below. Initially, a predetermined cellulose was added to a predetermined solvent to a predetermined concentration, stirred at a predetermined temperature for a predetermined time at 300 rpm, and yielded a series of cellulose solutions. The appearances of the cellulose solutions are indicated in Tables 1 and 2.

Next, a series of cellulose shaped articles [filament (yarn) or film] was prepared from each cellulose solution using the spinning/film-forming apparatus as illustrated in FIG. 1. Specifically, a poor solvent at a predetermined temperature was fed at a predetermined flow rate through a poor solvent feed line 2 into a cylindrical vessel from its bottom, and the solvent and other components were discharged from a solvents draw line 7 arranged at the upper part of the vessel. Independently, the cellulose solution was fed from a cellulose solution feed line 1, injected through a nozzle 3 (with a candle filter) having a shape corresponding to the target shaped article into the poor solvent charged in the vessel at a predetermined flow rate, and thereby brought into contact with the poor solvent to coagulate cellulose. The resulting cellulose shaped article (filament or film) 4 was wound by a takeup reel 5, washed sequentially with the used poor solvent and with water, dried at 60° C. under reduced pressure to a constant weight (washing/drying treatment 6), and yielded a series of cellulose shaped articles. The shapes and thicknesses of the resulting cellulose shaped articles are indicated in Tables 1 and 2. In each of Comparative Examples 1 to 4, the cellulose solution was found to include undissolved pieces in places, the nozzle was clogged with the undissolved pieces, and this impeded shaping.

cellulose (cellulose acetate). This was neutralized, washed with water thoroughly, and dried. After drying, the acetyl cellulose was dissolved in acetone to give a solution, the

TABLE 1

| | Cellulose solution preparation | | | | | | | Shaping conditions | | | | |
|---|---|---|---|---|---|---|---|---|---|---|---|---|
| | Solvent | | | | | | | Poor solvent | | Cellulose | Shaped article | |
| | | Water content (weight | | Cellulose Concentration in solution | Temper- ature | Time | | | Flow rate | Temper- ature | solution Flow rate | | |
| | Type | percent) | Type | (weight percent) | (° C.) | (min) | Appearance | Type | (g/min) | (° C.) | (g/min) | Shape | Thickness |
| Ex. 1 | A-1 | 20 | B-1 | 5 | 25 | 10 | transparent | C-1 | 10 | 25 | 1 | filament | 25 deniers. (d.) |
| Ex. 2 | A-1 | 20 | B-1 | 5 | 25 | 10 | transparent | C-1 | 10 | 25 | 1 | film | 25 μm |
| Ex. 3 | A-1 | 30 | B-1 | 15 | 25 | 10 | transparent | C-1 | 10 | 25 | 1 | filament | 75 d. |
| Ex. 4 | A-1 | 30 | B-1 | 15 | 25 | 10 | transparent | C-1 | 10 | 25 | 1 | film | 75 μm |
| Ex. 5 | A-1 | 40 | B-1 | 20 | 25 | 10 | transparent | C-1 | 10 | 25 | 1 | filament | 100 d. |
| Ex. 6 | A-1 | 40 | B-1 | 20 | 25 | 10 | transparent | C-1 | 10 | 25 | 1 | film | 100 μm |
| Ex. 7 | A-1 | 50 | B-1 | 15 | 25 | 10 | transparent | C-1 | 10 | 25 | 1 | filament | 75 d. |
| Ex. 8 | A-1 | 50 | B-1 | 15 | 25 | 10 | transparent | C-1 | 10 | 25 | 1 | filament | 75 d. |
| Ex. 9 | A-1 | 20 | B-1 | 25 | 25 | 10 | transparent | C-1 | 10 | 25 | 1 | filament | 25 d. |
| Ex. 10 | A-1 | 20 | B-1 | 25 | 25 | 10 | transparent | C-1 | 10 | 25 | 1 | film | 25 μm |
| Com. Ex. 1 | A-1 | 10 | B-1 | 25 | 25 | 10 | undissolved pieces found in places | C-1 | — | — | — | unshapable due to nozzle clogging with undissolved pieces | |
| Com. Ex. 2 | A-1 | 60 | B-1 | 25 | 25 | 10 | undissolved pieces found in places | C-1 | — | — | — | unshapable due to nozzle clogging with undissolved pieces | |

TABLE 2

| | Cellulose solution preparation | | | | | | | Shaping conditions | | | | |
|---|---|---|---|---|---|---|---|---|---|---|---|---|
| | Solvent | | | | | | | Poor solvent | | Cellulose | Shaped article | |
| | | Water content (weight | | Cellulose Concentration in solution | Temper- ature | Time | | | Flow rate | Temper- ature | solution Flow rate | | |
| | Type | percent) | Type | (weight percent) | (° C.) | (min) | Appearance | Type | (g/min) | (° C.) | (g/min) | Shape | Thickness |
| Ex. 11 | A-2 | 40 | B-1 | 15 | 25 | 10 | transparent | C-1 | 10 | 25 | 1 | filament | 75 d. |
| Ex. 12 | A-2 | 40 | B-1 | 15 | 25 | 10 | transparent | C-1 | 10 | 25 | 1 | film | 75 μm |
| Ex. 13 | A-2 | 50 | B-1 | 20 | 25 | 10 | transparent | C-1 | 10 | 25 | 1 | filament | 100 d. |
| Ex. 14 | A-2 | 50 | B-1 | 20 | 25 | 10 | transparent | C-1 | 10 | 25 | 1 | film | 100 μm |
| Com. Ex. 3 | A-2 | 10 | B-1 | 5 | 25 | 10 | undissolved pieces found in places | C-1 | — | — | — | unshapable due to nozzle clogging with undissolved pieces | |
| Com. Ex. 4 | A-2 | 60 | B-1 | 5 | 25 | 10 | undissolved pieces found in places | C-1 | — | — | — | unshapable due to nozzle clogging with undissolved pieces | |
| Ex. 15 | A-1 | 40 | B-1 | 20 | 25 | 10 | transparent | C-2 | 10 | 25 | 1 | filament | 100 d. |
| Ex. 16 | A-1 | 40 | B-1 | 20 | 25 | 10 | transparent | C-3 | 10 | 25 | 1 | filament | 100 d. |
| Ex. 17 | A-1 | 40 | B-1 | 20 | 25 | 10 | transparent | C-4 | 10 | 25 | 1 | filament | 100 d. |
| Ex. 18 | A-1 | 40 | B-1 | 20 | 25 | 10 | transparent | C-5 | 10 | 25 | 1 | filament | 100 d. |
| Ex. 19 | A-1 | 40 | B-2 | 7 | 25 | 480 | transparent | C-1 | 10 | 50 | 1 | filament | 35 d. |
| Ex. 20 | A-1 | 40 | B-3 | 7 | 25 | 480 | transparent | C-1 | 10 | 50 | 1 | filament | 35 d. |
| Ex. 21 | A-1 | 40 | B-4 | 7 | 25 | 480 | transparent | C-1 | 10 | 50 | 1 | filament | 35 d. |

Example 22

The cellulose film obtained in Example 2 was pulverized, subjected to solvent replacement sequentially with three organic solvents, i.e., methanol, acetone, and hexane in this order, dried, and yielded a powdered cellulose. The powdered cellulose was combined with forty times the amount (in weight) of acetyl chloride to give a mixture, and the mixture was held at a temperature of from 20° C. to 30° C. for 10 hours to carry out an acetylation reaction. Next, the reaction mixture was placed in a large amount of water and yielded acetyl cellulose (cellulose acetate). This was neutralized, washed with water thoroughly, and dried. After drying, the acetyl cellulose was dissolved in acetone to give a solution, the solution was placed in a glass flat-bottomed vessel, air-dried therein, and an acetyl cellulose film formed at the bottom of the vessel was collected. The acetyl cellulose (cellulose acetate) had a degree of acetylation of 2.4. The acetyl cellulose was subjected to atomic absorption spectrometry and found to include no sulfur component.

Example 23

Acetyl cellulose was prepared by the procedure of Example 22, except for adding to the powdered cellulose as in Example 22 an equivalent amount (in weight) of potassium acetate to give a mixture, and further adding forty times the amount (in weight) of acetyl chloride to the mixture. The acetyl cellulose had a degree of acetylation of 2.5.

Comparative Example 5

Acetyl cellulose was prepared by the procedure of Example 23, except for using the raw material B-1 as a powdered cellulose. The acetyl cellulose had a degree of acetylation of 1.3.

Comparative Example 6

Acetyl cellulose was prepared by the procedure of Comparative Example 5, except for using the raw material B-2 instead of the raw material B-1. The acetyl cellulose had a degree of acetylation of 1.1.

Comparative Example 7

Acetyl cellulose was prepared by the procedure of Comparative Example 5, except for using the raw material B-3 instead of the raw material B-1. The acetyl cellulose had a degree of acetylation of 1.4.

Comparative Example 8

Acetyl cellulose was prepared by the procedure of Comparative Example 5, except for using the raw material B-4 instead of the raw material B-1. The acetyl cellulose had a degree of acetylation of 0.9.

Reference Signs List
1 cellulose solution feed line
2 poor solvent feed line
3 nozzle (spinneret or film-forming die head) and candle filter
5 filament or film
5 takeup reel
6 washing/drying treatment
7 solvents draw line

The invention claimed is:

1. A process for producing a solid cellulose, the process comprising the steps of:
   (A) dissolving cellulose in a solvent (s1) to give a cellulose solution, the solvent (s1) comprising at least one onium hydroxide in a content of from 45 to 85 percent by weight and water in a content of from 15 to 55 percent by weight based on the total weight of the solvent (s1), the at least one onium hydroxide selected from the group consisting of quaternary phosphonium hydroxides and quaternary ammonium hydroxides;
   (B) bringing the cellulose solution obtained in Step (A) into contact with a poor solvent (s2) to precipitate cellulose as a cellulose solidified article; and
   (C) separating and collecting the cellulose solidified article precipitated in Step (B).

2. The process according to claim 1, wherein Step (B) comprises mixing the cellulose solution with the poor solvent (s2) with stirring to precipitate cellulose in the form of flakes.

3. The process according to claim 2, further comprising, between Step (B) and Step (C), the step of:
   (B') adding an organic solvent (s3) to a mixture obtained from Step (B) and separating the resulting mixture into an upper layer and a lower layer, the organic solvent (s3) being separable from water and having a specific gravity higher than that of water and lower than that of cellulose, the upper layer mainly comprising water, and the lower layer mainly comprising the organic solvent (s3) and further comprising the cellulose flakes precipitated at the bottom,
   wherein Step (C) comprises separating and collecting the cellulose flakes together with, or separately from, a liquid constituting the lower layer.

4. A process for producing a solid cellulose, the process comprising the steps of:
   (A) dissolving cellulose in a solvent (s1) to give a cellulose solution, the solvent (s1) comprising at least one onium hydroxide in a content of from 45 to 85 percent by weight and water in a content of from 15 to 55 percent by weight based on the total amount of the solvent (s1), the at least one onium hydroxide selected from the group consisting of quaternary phosphonium hydroxides and quaternary ammonium hydroxides; and
   (D) introducing the cellulose solution obtained in Step (A) into a poor solvent (s2) using a discharger to coagulate cellulose to thereby give a cellulose shaped article.

5. The process according to claim 4, wherein the cellulose shaped article is in the form of a fiber, a film, or granules or particles.

6. The process according to claim 1, wherein the solvent (s1) comprises the at least one onium hydroxide in a content of from 50 to 80 percent by weight; and water in a content of from 20 to 50 percent by weight based on the total amount of the solvent (s1).

7. The process according to claim 4, wherein the solvent (s1) comprises the at least one onium hydroxide in a content of from 50 to 80 percent by weight; and water in a content of from 20 to 50 percent by weight based on the total amount of the solvent (s1).

8. The process according to claim 6, wherein the solvent (s1) comprises the at least one onium hydroxide in a content of from 50 to 70 percent by weight; and water in a content of from 30 to 50 percent by weight based on the total amount of the solvent (s1).

9. The process according to claim 1, wherein the at least one onium hydroxide comprises at least one selected from tetrabutylphosphonium hydroxide and tetrabutylammonium hydroxide.

10. The process according to claim 4, wherein the at least one onium hydroxide comprises at least one selected from tetrabutylphosphonium hydroxide and tetrabutylammonium hydroxide.

11. The process according to claim 1, wherein the poor solvent (s2) comprises an organic solvent having a boiling point lower than that of water.

12. The process according to claim 4, wherein the poor solvent (s2) comprises an organic solvent having a boiling point lower than that of water.

13. The process according to claim 11, wherein the organic solvent having a boiling point lower than that of water comprises at least one selected from the group consisting of methanol, ethanol, 2-propanol, and acetone.

14. A process for producing a cellulose ester, the process comprising the steps of:
   (A) dissolving cellulose in a solvent (s1) to give a cellulose solution, the solvent (s1) comprising at least one onium hydroxide in a content of from 45 to 85 percent by weight and water in a content of from 15 to 55 percent by weight based on the total weight of the solvent (s1), the at least one onium hydroxide selected from the group consisting of quaternary phosphonium hydroxides and quaternary ammonium hydroxides;

(B) bringing the cellulose solution obtained in Step (A) into contact with a poor solvent (s2) to precipitate cellulose as a cellulose solidified article;

(C) separating and collecting the cellulose solidified article precipitated in Step (B);

(E) bringing the cellulose solidified article separated and collected in Step (C) into contact with an esterifying agent in a solvent to form a cellulose ester; and (F) separating and collecting the cellulose ester formed in Step (E).

15. The process according to claim 14, wherein Step (B) comprises mixing the cellulose solution with the poor solvent (s2) with stirring to precipitate cellulose in the form of flakes.

16. The process according to claim 15, further comprising, between Step (B) and Step (C), the step of:

(B') adding an organic solvent (s3) to a mixture obtained from Step (B) and separating the resulting mixture into an upper layer and a lower layer, the organic solvent (s3) being separable from water and having a specific gravity higher than that of water and lower than that of cellulose, the upper layer mainly comprising water, and the lower layer mainly comprising the organic solvent (s3) and further comprising the cellulose flakes precipitated at the bottom, wherein Step (C) comprises separating and collecting the cellulose flakes together with, or separately from, a liquid constituting the lower layer.

17. The process according to claim 14, wherein Step (B) comprises introducing the cellulose solution obtained in Step (A) into the poor solvent (s2) using a discharger to precipitate cellulose in the form of a monofilament.

18. The process according to claim 14, wherein Step (B) comprises adding the cellulose solution obtained in Step (A) dropwise to the poor solvent (s2) using a discharger to precipitate cellulose in the form of granules or particles.

19. The process according to claim 14, wherein Step (E) comprises bringing the cellulose solidified article separated and collected in Step (C) into contact with a carboxylic anhydride in a poor solvent for the target cellulose ester.

20. A cellulose-cellulose ester composite produced by the process according to claim 19 and having a core-shell structure comprising a cellulose ester as the shell in a surface layer; and cellulose as the core.

* * * * *